Patented Mar. 11, 1952

2,588,852

UNITED STATES PATENT OFFICE 2,588,852

PROCESS FOR PREPARING BETA-BROMO, ALPHA CHLORO, BETA-FORMYL ACRYLIC ACID

Erwin Kuh, New Brunswick, N. J., assignor to American Cyanamid Company, New York, N. Y., a corporation of Maine No Drawing. Application May 27, 1950, Serial No. 164,851

3 Claims. (Cl. 260—539)

This invention relates to the preparation of a new organic compound. More particularly, it relates to beta-bromo-alpha-chloro-beta-formylacrylic acid (mucobromochloric acid) and a method of preparation thereof. This compound is a versatile material for organic syntheses. It contains two halogen atoms differentially reactive, a double bond and an aldehyde group as well as a carboxylic acid group. It is of particular value in the preparation of nitromalonaldehyde.

In the past H. B. Hill (Proc. Am. Academy of Arts and Sciences XXIV, page 334 (1889)) described the preparation of beta-chloro-alpha-bromo-beta-formylacrylic acid by the following series of reactions: tetrachlorination of ethyl furoate, thermal degradation to a mixture of different compounds among them 4,5-dichloro-2-furoic acid, separation of the latter by repeated fractional vacuum distillation, reduction of this dichloric acid with zinc to the 4-chloro-furoic acid, and treatment of this acid with bromine in water to obtain the beta-chloro-alpha-bromo-beta-formylacrylic acid (mucochlorobromic acid) in a very small yield. This process is undesirable as the steps are numerous, the reagents expensive and the yields extremely low. Although this compound of Hill is isomeric with that of the present invention, it can be distinguished from the beta-bromo-alpha-chloro-beta-formylacrylic acid by structure, method of preparation, reactivity and utility.

Although the melting points as well as the mixed melting point are very close, the infrared spectrum shows without doubt that both are chemically unique and different from each other. Comparison of these spectra with those of the known alpha,beta-dichloro-beta-formylacrylic acid (mucochloric acid) and alpha-beta-dibromo-beta-formylacrylic acid (mucobromic acid) characterizes the new acid as the beta-bromo-alpha-chloro compound, whereas Hill's acid definitely is the beta-chloro-alpha-bromo-beta-formylacrylic acid.

There is also a significant difference in the chemical behavior of the two compounds especially when reacted with sodium nitrite under certain conditions. The compound of the present invention reacts easily with sodium nitrite and produces good yields of nitromalonaldehyde. The known isomeric compound, however, treated in the same way, gives much lower yields of the nitromalonaldehyde.

Nitromalonaldehyde has been prepared in the past solely from mucobromic acid. Substitution for the latter of the commercially available mucochloric acid results in the formation of very little if any nitromalonaldehyde. Mucobromic acid, although producing good yields of nitromalonaldehyde, is itself costly and rather dangerous to prepare since it requires 5 mole equivalents of expensive bromine (and only one equivalent is included in the final compound). The reaction is quite violent and difficult to control and an expensive bromine recovery system is required to make the procedure at all economical.

I have found that the new compound of the present invention, beta-bromo-alpha-chloro-beta-formylacrylic acid, can be prepared in a single step from readily available and comparatively cheap intermediates. The process may be illustrated by the following equation:

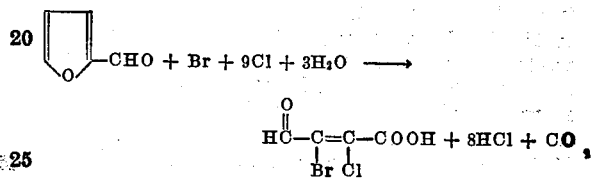

$$HOOC-C=C-CHO + Br + 9Cl + 3H_2O \longrightarrow$$

$$\underset{\underset{Br}{|}\ \underset{Cl}{|}}{HO-C=C-COOH} + 8HCl + CO,$$

This process uses only one-half mole equivalent of bromine and substitutes the cheaper, safer and more easily handled chlorine to regenerate bromine from the hydrobromic acid formed in the reaction.

The compound of the present invention is a white crystalline solid relatively insoluble in cold water, very soluble in hot water which melts at 122.6° to 123° C. The compound has in its crystal form a plane of optic axis forming an angle of 135° with 001 face. The compound has infrared absorption bands at 1026 cm.$^{-1}$ and at 1098 cm.$^{-1}$.

The process of the present invention is preferably carried out by dissolving the bromine in hydrobromic acid and heating the mixture to a temperature within the range of about 50° C. to 80° C. A small portion of the furfural is then added and after reaction thereof the chlorine along with the remainder of the furfural is added at a controlled rate. To complete the reaction the temperature is allowed to rise to about 95° C. On cooling the product separates as a precipitate. Yields of as high as 90% of theoretical based on the furfural taken as starting material are consistently obtained.

Mucobromochloric acid is useful in a large number of chemical reactions. Of special interest is the reaction with sodium nitrite to produce nitromalonaldehyde which in turn can be reacted with guanidine to produce 2-amino-5-nitropyrimidine in good over-all yields. This compound has recently been found to be highly active in the therapeutic and prophylactic treatment of blackhead disease in turkeys.

The following examples illustrate methods of carrying out the present invention wherein mucobromochloric acid is prepared from furfural. All parts are by weight unless otherwise indicated.

*Example 1*

To a round-bottom flask with 5-necks containing an efficient agitator, a long reflux condenser, a dropping funnel with a long capillary stem, a sub-surface gas feed tube and a thermometer, there are charged 6 parts of hydrobromic acid 48%, 7 parts of water and 3 parts of bromine. The bromine dissolves completely in the liquid. The contents of the flask is heated to 65° C. and 4 parts of furfural added at such a rate that the steady flow through the capillary takes about 2½ hours. The furfural reacts exothermically with the bromine. The temperature is allowed to reach 70° C. and the bromine starts to reflux. As soon as the deep red color of the liquid becomes lighter, a fast current of chlorine is passed through and the temperature kept at 75°–80° C. by external cooling. The flow of furfural and chlorine should be adjusted in the ratio 1:3 by weight. When about two-fifths of the furfural is added, large quantities of hydrogen chloride together with some carbon dioxide escape through the condenser carrying some bromine with them. Almost no cooling is now needed to keep the temperature at 80°–85° C. After all the furfural is in, the chlorine current is cut in half and the temperature slowly raised to 95° C. When about 90% of the theoretically needed chlorine is used, it is stopped and the light yellow liquid slowly cooled to 5° C. The slurry of almost white crystals is filtered and washed with a small quantity of ice water. Yield, 90–94% of theory of mucobromochloric acid.

*Example 2*

Using the same equipment as in Example 1 there are placed 7 parts of water and 3 parts of bromine-sulfur dioxide is fed above the surface of the liquid with vigorous agitation and external cooling, until the bromine is completely consumed and the liquid quite colorless. 3 parts of bromine are added. They dissolve completely in the liquid forming a deep red solution. 4 parts of furfural and 90% of the theoretical amount of chlorine are then added in the same manner as described in Example 1. A yield of 88–90% of mucobromochloric acid, based on the furfural present, is obtained.

I claim:

1. A method of preparing beta-bromo-alpha-chloro-beta-formylacrylic acid which comprises heating furfural and bromine in the presence of hydrobromic acid, subsequently adding chlorine and recovering said product therefrom.

2. A method of preparing beta-bromo-alpha-chloro-beta-formylacrylic acid which comprises heating furfural and bromine to a temperature within the range of from 50° C. to 80° C. in the presence of hydrobromic acid, subsequently adding chlorine and recovering said product therefrom.

3. A method of preparing beta-bromo-alpha-chloro-beta-formylacrylic acid which comprises heating furfural and bromine and subsequently adding chlorine and recovering said product therefrom.

ERWIN KUH.

REFERENCES CITED

The following references are of record in the file of this patent:

UNITED STATES PATENTS

| Number | Name | Date |
|---|---|---|
| 2,404,929 | Seymour | July 30, 1946 |

OTHER REFERENCES

Hill et al.: Beilstein (Handbuch, 4th ed.), vol. 3, p. 728 (1921).